(12) United States Patent
Park (10) Patent No.: US 12,246,862 B1
(45) Date of Patent: Mar. 11, 2025

(54) DRONE WITH STABLE LANDING AND SHOCK ABSORBING FUNCTION

(71) Applicant: Yubin Park, Seogwipo-si (KR)

(72) Inventor: Yubin Park, Seogwipo-si (KR)

( * ) Notice: Subject to any disclaimer, the term of this patent is extended or adjusted under 35 U.S.C. 154(b) by 0 days.

(21) Appl. No.: 18/427,673

(22) Filed: Jan. 30, 2024

(30) Foreign Application Priority Data

Dec. 29, 2023 (KR) ........................ 10-2023-0195932

(51) Int. Cl.
| | | |
|---|---|---|
| *B64U 10/50* | (2023.01) | |
| *B64D 25/08* | (2006.01) | |
| *B64U 20/60* | (2023.01) | |
| *B64U 30/299* | (2023.01) | |
| *B64U 60/50* | (2023.01) | |

(52) U.S. Cl.
CPC ............. *B64U 10/50* (2023.01); *B64D 25/08* (2013.01); *B64U 20/60* (2023.01); *B64U 30/299* (2023.01); *B64U 60/50* (2023.01); *B64U 2201/20* (2023.01)

(58) Field of Classification Search
CPC ........ B64D 25/08; B64U 10/50; B64U 20/60; B64U 20/65; B64U 30/29; B64U 30/291; B64U 30/292; B64U 30/293; B64U 30/299; B64U 60/00; B64U 60/20; B64U 60/40; B64U 60/50; B64U 60/55; B64U 70/80; B64U 70/83; B64U 70/87; B64U 2201/20
USPC ...................................................... 244/17.23
See application file for complete search history.

(56) References Cited

U.S. PATENT DOCUMENTS

| | | | | |
|---|---|---|---|---|
| 11,130,585 | B2 * | 9/2021 | Nakamura | B64C 31/036 |
| 11,260,972 | B2 * | 3/2022 | Zhang | B32B 27/08 |
| 11,286,051 | B2 * | 3/2022 | Yagihashi | B64D 17/80 |
| 11,420,732 | B2 * | 8/2022 | Atsumi | B64C 17/02 |
| 2014/0249702 | A1 * | 9/2014 | Pflug | B64C 25/52 701/16 |
| 2016/0340028 | A1 * | 11/2016 | Datta | B64C 15/12 |
| 2017/0205536 | A1 * | 7/2017 | Musso | G01W 1/08 |
| 2017/0313433 | A1 * | 11/2017 | Ozaki | B64U 70/83 |
| 2018/0208309 | A1 * | 7/2018 | Wang | B64C 35/008 |
| 2020/0115049 | A1 * | 4/2020 | Nakamura | B64D 17/025 |
| 2020/0140067 | A1 * | 5/2020 | Mo | B64C 25/26 |
| 2020/0148337 | A1 * | 5/2020 | Ni | B64C 25/12 |
| 2020/0198790 | A1 * | 6/2020 | Yagihashi | B64D 17/025 |
| 2020/0307755 | A1 * | 10/2020 | Zhang | B64U 30/293 |
| 2021/0206497 | A1 * | 7/2021 | Yagihashi | B64D 17/72 |
| 2022/0073209 | A1 * | 3/2022 | Shen | B64D 17/70 |

(Continued)

FOREIGN PATENT DOCUMENTS

| | | | | | |
|---|---|---|---|---|---|
| CN | 116834997 | A | * | 10/2023 | ............. A62C 19/00 |
| KR | 102538809 | B1 | | 5/2023 | |
| KR | 2680306 | B1 | * | 7/2024 | ............. B64C 39/024 |

*Primary Examiner* — Joshua E Rodden
(74) *Attorney, Agent, or Firm* — NKL Law; Jae Youn Kim (57) ABSTRACT

Provided includes the main body part 100 in which a number of rotors 101 controlled by the control unit 110 are installed on the outside, a number of wing bodies 200 in which the elastic member 220 is opened to both sides to absorb the impact in the event of a collision with the guide 210 placed on the outer side of the rotor 101, a parachute deployment unit 300 installed on the upper side of the main body part 100 and ejecting the parachute canopy 320 upward in an emergency situation, a lower airbag ejection unit 400 installed under the main body part 100 and inflating the lower airbag 401 downward in an emergency situation, and a landing gear unit 500 installed under the main body part 100.

2 Claims, 10 Drawing Sheets

(56) References Cited

U.S. PATENT DOCUMENTS

| | | | | |
|---|---|---|---|---|
| 2023/0127058 A1* | 4/2023 | Yamato | ................. | B64U 10/13 |
| | | | | 244/17.27 |
| 2024/0255010 A1* | 8/2024 | Otsubo | ................. | B64D 17/80 |
| 2024/0391614 A1* | 11/2024 | Ashida | ................. | B64D 17/76 |

* cited by examiner

DRONE WITH STABLE LANDING AND SHOCK ABSORBING FUNCTION

TECHNICAL FIELD

This application relates to drones which can land stably while reducing the impact, and in the event of an emergency during flight deploy the parachute primarily, and if the parachute is not deployed, inflate the upper and lower airbags to prevent damage to drones and ground objects.

BACKGROUND TECHNOLOGY OF THE INVENTION

To prevent drone crashes, technologies for installing parachutes or airbags on drones have been developed.

When a parachute was provided on a conventional drone, there was a problem that the drone crashed due to the late deployment, or the parachute did not deploy due to insufficient drop distance, causing the drone to crash as it was. In addition, there was a problem that the parachute malfunction frequently occurred when strong winds blew or rained.

In addition, even if a conventional drone is equipped with an airbag, the expansion of the airbag may interfere with the drone's components, so there was a problem that the expansion of the airbag was not performed properly.

In addition, conventional drones not only have a complex shock absorbing structures for landing, but also do not take into account the case of landing on a non-flat landing surface or sloping terrain.

PRIOR ART LITERATURE

Patent Literature

Korean Patent Registration No. 10-2538809.

CONTENTS OF THE INVENTION

Purpose of Invention

This invention has been devised to solve the above conventional problems at once, and the purpose of this invention is to provide a drone with both stable landing and shock buffering functions that can land stably while mitigating the impact, and if the parachute does not deploy, the upper and lower airbag expand and prevent damage to drones and ground objects.

Solution to the Problem

In order to achieve the above purpose, as a preferred embodiment of a drone having a stable landing and shock absorption function according to the present invention.

A drone with stable landing and shock absorbing function comprising:
- a main body part, in which a control unit is provided inside and a plurality of rotors controlled by the control unit are installed outside;
- a plurality of wing body including a ring-shaped guide disposed on the outer portion of the rotors to surround the rotors and elastic member one end of which is bisected from the main body part extending to the outside of the main body part and the other end of which is connected to guide, and allowing the elastic member to be split on both sides to absorb shock when a collision occurs against the guide;
- a parachute deployment unit that is installed on the upper side of the main body part and ejects a parachute canopy upward in an emergency situation;
- a lower airbag ejection unit that is installed under the main body part and inflates a lower airbag downward in an emergency situation; and
- a landing gear unit installed on the lower side of the main body part.

In a further embodiment, the parachute deployment unit includes:
- a pair of opening-closing cover facing each other correspondingly on the upper side of the main body part, one end of which is hinged respectively, and the other end of which is in contact with each other is respectively provided with magnet having different magnetism;
- a parachute canopy that is stored in a space formed on the upper side of the main body part by the opening-closing cover when the opening-closing cover is covered while being connected to a number of canopy lines, wherein one end of the canopy lines is fixed on the upper side of the main body part; and
- an ejection member which is placed under the parachute canopy, is provided with an upper airbag inside, and operates upward under the control of the control unit in an emergency situation to open the opening-closing cover and eject the parachute canopy to the outside or inflate the upper airbag upward.

In addition, in a further embodiment, the landing gear unit comprises:
- a pair of horizontal landing gears that comes into contact with the landing surface when the drone lands provided with a coupler formed at the top; and
- a plurality of vertical landing gears which are coupled to the horizontal landing gear and are respectively installed into the landing gear insertion tube formed on the lower side of the main body part.

In a further embodiment, the vertical landing gear includes:
- a first vertical landing gear which is provided with a landing adjuster coupled to the coupler at the bottom, installed on the horizontal landing gear through the landing adjuster, and provided with a buffer damper at the top; and
- a second vertical landing gear which is installed above the first vertical landing gear with a part of its upper side inserted into the landing gear insertion tube formed under the main body part, the upper end of which is connected to the spring installed inside the main body part, the lower end of which is coupled to the rod of the buffer damper, and has a locking groove formed on one side.

A activating member is installed at one side of the landing gear insertion tube respectively, the activating member is pinned rotatably by pin in the main body part, one end of which is provided with a hook that can be caught by the locking groove, and the other end of which is provided with a pivoting magnet piece.

A operating magnet piece having the same magnetism as the pivoting magnet piece moves toward the pivoting magnet piece under the control of the control unit in an emergency situation and pivots the pivoting magnet piece, then the hook is separated from the locking groove of the second vertical landing gear and the second vertical landing gear connected to the spring in an extended state is drawn into the landing gear insertion tube by the restoring force of the spring.

In addition, as an embodiment of this invention, wherein the landing adjuster includes:
- a coupling piece which is coupled to the lower end of the first vertical landing gear and has a ball receiving groove for accommodating a rocking ball;
- a rocking member in which the rocking ball formed in a spherical shape on the upper part is placed to be rocked in the ball receiving groove, and the lower part is screwed to the coupler;
- a plurality of adjusting bolts which are provided at the bottom of the coupling piece in all directions or radially around the rocking member and are screwed to the coupling piece so as to adjust the degree of protrusion of a head facing downward.

In a further embodiment, wherein the control unit includes a posture sensor that detects the drone's flight posture and a wireless communication unit that can communicate wirelessly with a remote controller.
- also, wherein the control unit determines whether the drone's flight posture is normal through the posture sensor, in case of an emergency situation where the flight posture is abnormal, primarily operates the ejection member upward to ejects the parachute canopy, Afterwards, if the ejected parachute canopy is not deployed and the abnormal posture continues for a certain period of time, under the control of the control unit, the upper airbag is inflated upward by the ejection member and the operating magnet piece is directed toward the pivoting magnet piece so that the second vertical landing gear is drawn into the landing gear insertion tube, and at the same time the lower airbag is inflated downward by the lower airbag ejection unit.

In addition, as an example of this invention, wherein The guide of the wing body is provided with a cushioning material made of a memory foam material on the outer circumferential surface thereof; and The elastic member of the wing body contains ethylene vinyl acetate (EVA), Linear Low Density Poly Ethylene (LLDPE), and natural rubber as components.

Effects of the Invention

According to the invention of this drone,
1) The landing gear unit alleviates the impact when landing, and the drone can land stably even if the landing site is not flat;
2) In the event of an emergency during flight, the parachute may be deployed automatically or wirelessly, and if the parachute does not deploy in the air and continues to fall out of control, the upper and lower airbags will expand and there will be no structural obstacles when the airbag expands;
3) The wing body where the rotor (propeller) is installed is made of elastic material and has a structure that is divided into two branches, so that even if the drone falls freely and collides with the ground as a side (wing body's guide), the elastic material or wing body can be split on both sides to alleviate the impact.

DETAILED DESCRIPTION

The present invention relates to a drone that can land stably, and in the event of an emergency during flight, the parachute is deployed primarily, but if the parachute is not deployed, the upper and lower airbags are inflated and the sides are protected from ground objects due to the shock absorbing structure and elastic material so that damage can be prevented in the event of a collision.

Hereinafter, the technical idea of the present invention will be described in detail with reference to the accompanying drawings through preferred embodiments of the present invention.

Figure 1:
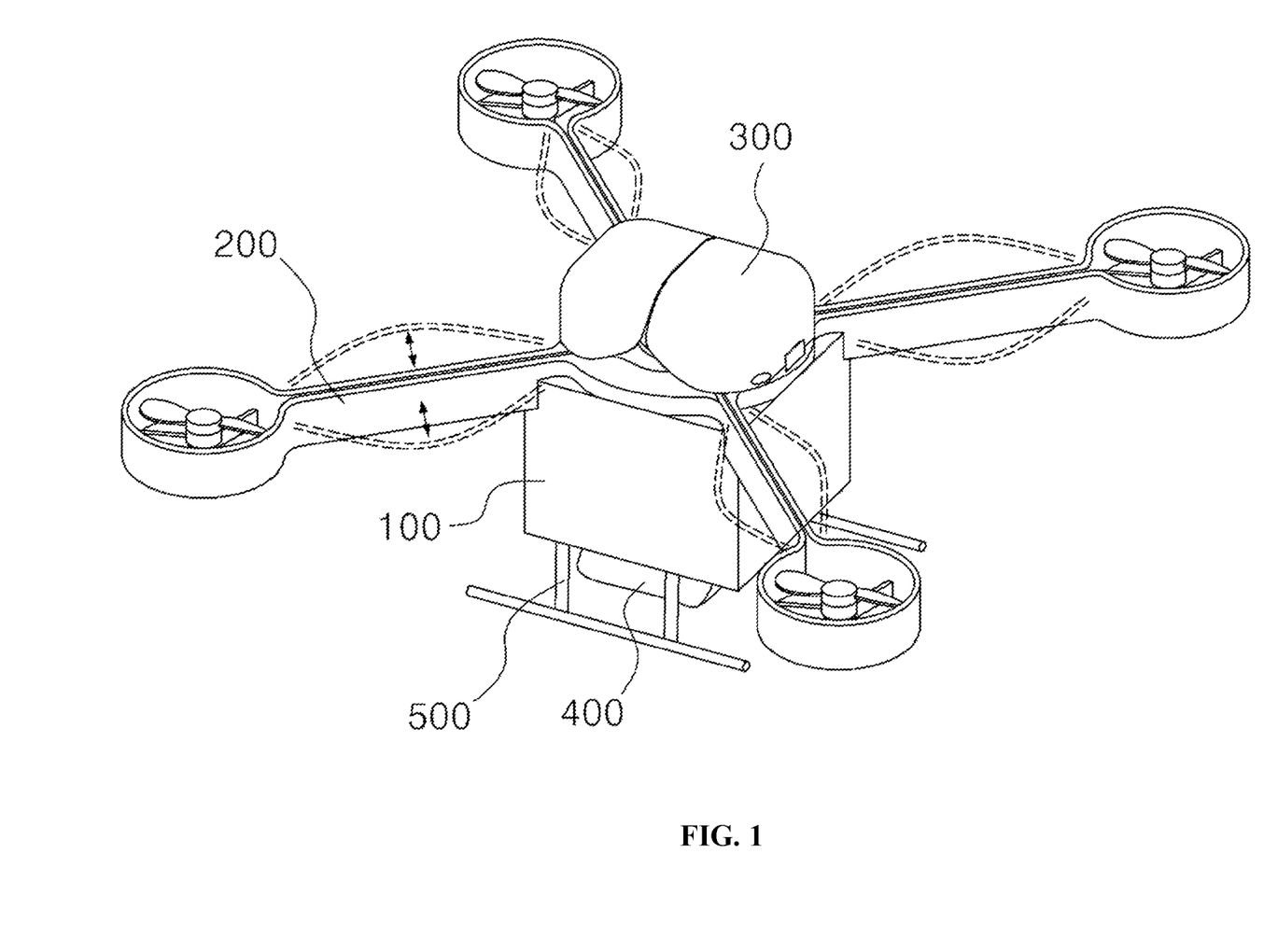
FIG. 1 is a drawing illustrating an exterior configuration of a drone according to an embodiment of the present invention.

As shown in FIGS. 1, the drone of the present invention includes a main body part 100, a plurality of wing bodies 200 installed outside the main body part 100, a parachute deployment unit 300, a lower airbag ejection unit 400, and a landing gear unit 500.

First of all, the main body part 100 of the present invention has a control unit 110 inside to rotate the rotor 101, controls the flight and driving of the drone, and includes a flight driving unit, a posture sensing unit, and a wireless communication unit, although not shown.

The flight driving unit may control a motor (not shown) for rotating the rotor 101 which is a rotating blade (propeller) according to the control signal of the remote controller 600 transmitted from the wireless communication unit, and various known technologies may be applied to this technology.

The posture sensing unit detects the flight posture of the drone, and determines whether the flight posture of the drone is more than a preset inclination value (slope angle or inclination) or out of a preset azimuth change value range, which is known as an embodiment. It can be implemented by applying a gyro sensor.

In this invention, an emergency situation refers to a case in which the drone's flight posture is abnormal through the posture sensor unit, and more specifically, the drone falls without going to its normal flight orbit due to abnormal operation of one or more of the rotors, or the drone continues to fall because the parachute canopy is not properly unfolded in the air even though the parachute canopy is ejected. In this case, since the main body of the drone falls and rotates abnormally, the posture sensor unit determines that the drone's flight posture is more than a preset inclination value (slope angle or tilt angle) or is out of the preset azimuth change value range.

The wireless communication unit communicates with the remote controller 600 of the drone operator through a wireless communication method, and it also receives a drone control signal from the remote controller 600 and transmits the drone flight signal generated by the drone itself to the wireless controller.

The drone control signal includes not only the rotor driving signal or a flight control signal, but also a parachute deployment signal capable of deploying a parachute canopy through the wireless controller in an emergency situation.

In addition, the drone flight signal includes not only flight state data such as altitude or speed, but also a warning signal for an emergency situation.

The main body part 100 of the present invention controls the rotor 101 as described above, detects the flight posture of the drone through the control unit 110, determines an emergency situation, communicates wirelessly with the remote controller 600, and controls the drone.

As shown in FIGS. 1, the rotor 101 is supported by a wing body or guide on the outside of the main body part 100, and a plurality of rotors are installed.

Figure 2:
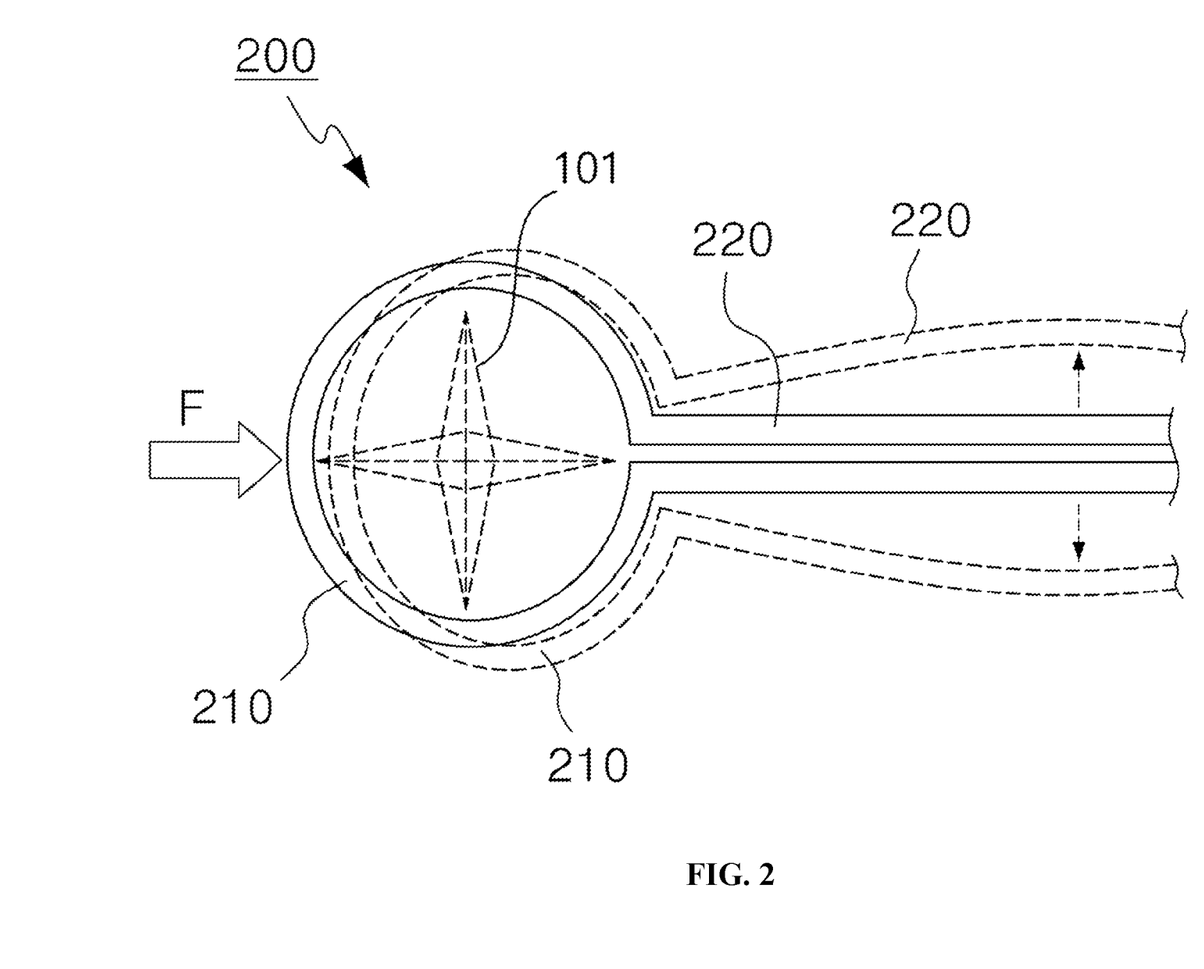
FIG. 2 shows a wing body part according to one embodiment of the present invention, and is drawing to explain a process in which elastic materials are elastically expanded to both sides when external force (F) acts due to a collision in the guide part.

The wing body 200 of the present invention consists of a ring-shaped guide 210 disposed outside the rotor 101 to surround the rotor 101 as shown in FIG. 1 and FIG. 2, and an elastic member 220 that is bisected at one end and extends to the outside of the main body part 100 and the other end is connected to the guide 210.

The guide 210 is a member that surrounds the rotor 101 at a predetermined distance from the outside of the rotor 101 for safety, etc., and as shown in FIG. 2, it does not have a closed ring shape, but has an open ring shape with one side connected to the elastic member 220, and as a preferred embodiment, a cushioning material (not shown) made of a known memory foam material may be detachably provided on the outer circumferential surface of the guide 210.

Therefore, The guide 210 is not only provided to surround the rotor 101 for safety reasons, but also functions to alleviate or absorb shock when a collision occurs on the guide 210.

The elastic member 220 of the present invention has two material extending from the main body part 100 to one side of the guide 210, and the two materials are separated and extended to the outside of the main body part 100 to be connected to the open guide 210 and made of flexible or elastic materials, respectively. As shown in FIG. 2, when the external force (F) acts on the guide 210 due to a collision with the guide 210, the elastic member 220 spreads to both sides in an arc shape, and the impact is absorbed or alleviated.

As a preferred embodiment of this invention, the elastic member 220 may contain ethylene vinyl acetate (EVA), linear low density poly ethylene (LLDPE), and natural rubber to maximize elasticity or flexibility function.

Since the elastic member 220 is formed by a combination of EVA, LLDPE, and natural rubber components, physical properties for absorbing impact or vibration are more excellent, and flexibility or elasticity for returning to an original state is very excellent.

Therefore, the drone of the present invention not only has the shock absorbing ability of the guide 210 itself due to the cushioning material made of memory foam, but also the elastic member 220, which has excellent shock absorption rate and elasticity or elasticity, is spreaded (opened) to both sides, so even if collision with the side of the guide 210 occurs, almost no damage occurs due to the impact.

As shown in FIGS. 1, the parachute deployment unit 300 of this invention is installed on the upper side of the main body part 100 and primarily ejects the parachute canopy 320 upward in an emergency situation in which a drone flies or falls in an abnormal state.

Figure 3:
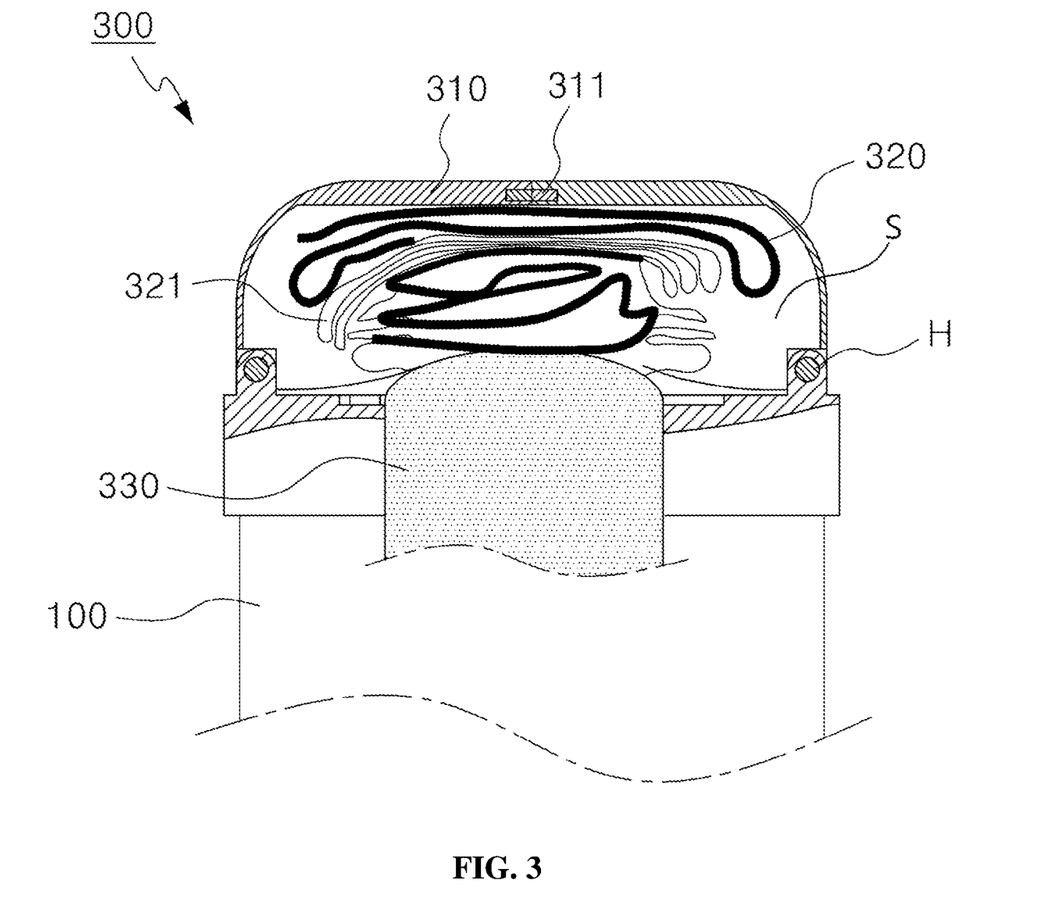
FIG. 3 is a drawing showing an internal configuration of a parachute deployment unit according to an embodiment of the present invention.

As a preferred embodiment, As shown in FIGS. 3, the parachute deployment unit 300 includes a pair of opening and closing covers 310, a parachute canopy 320 accommodated inside the opening and closing cover 310, and an ejection member 330 whose operation is controlled by the control unit 110.

The opening/closing cover 310 is a pair of materials that face each other correspondingly on the upper side of the main body part 100, one end is hinged respectively, and forms a space S in which the parachute canopy 320 can be accommodated on the upper side of the main body part 100 while being opened and closed by a hinge H, Magnets 311 with different magnetism are respectively provided on one side of the other end where the pair is in contact with each other, so that opening and closing is adjusted or controlled.

The parachute canopy 320 is made of a known parachute material and is connected to a plurality of canopy lines 321 or parachute ropes with one end fixed on the upper side of the main body part 100, and when the opening and closing cover 310 is covered, it is accommodated in the space S formed on the upper side of the main body part 100 by the opening and closing cover 310, and is ejected and deployed outside the space S in an emergency situation.

Figure 4:
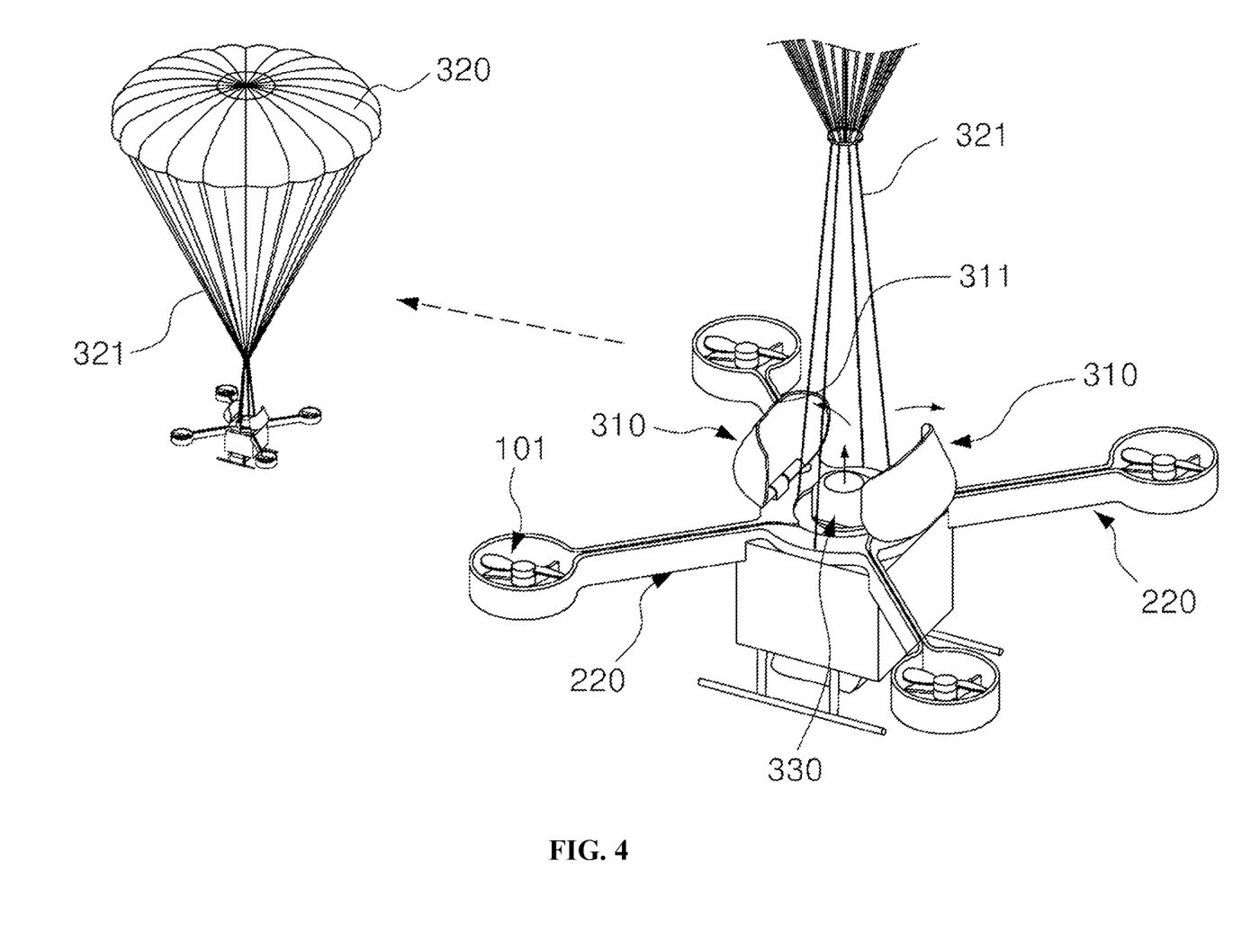
FIG. 4 is drawing showing a state in which the ejection member is operated upward by the control unit according to an embodiment of the present invention and the parachute canopy is ejected to the outside when an emergency situation occurs while the drone is flying.

The ejection member 330 is a material placed under the parachute canopy 320 and equipped with an upper airbag 331 inside, First, As shown in FIGS. 4, it is a material that opens the opening and closing cover 310 while pushing the upper parachute canopy 320 by operating or moving upward under the control of the control unit 110.

More specifically, when a drone flies above a set inclination value (slope angle) or beyond a set azimuth value change range due to a failure of the rotor 101, that is, when an emergency occurs during flight, the posture sensor unit firstly generates a signal to operate the ejection member 330 upward, and then transmits the signal to a driving means (not shown) that is connected to the ejection member 330 to operate the ejection member 330 upward, and the ejection member driving means that received the signal operates the ejection member 330 upward strongly enough to offset the attractive action of the magnet 311 at a high speed. In this case, the ejection member driving means may be implemented by applying various known techniques.

As the ejection member 330 operates strongly upward, the opening and closing cover 310 closed by the attraction of the magnet 311 is opened to both sides, and the parachute canopy 320 is ejected to the outside of the drone thanks to the strong lifting force of the ejection member 330.

FIG. 4 indicates that after the ejection member 330 operates upward, the parachute canopy 320 is ejected to the outside and the parachute canopy 320 is normally unfolded, and the canopy line 321 is pulled tightly.

A drone hanging from a parachute, such as FIG. 4, does not fly abnormally or freely drop dangerously, can minimize collision damage when landing, and can land under the control of the remote controller 600 if driving control is possible while hanging from the parachute.

As an embodiment, the ejection member 330 may be maintained by a compressed spring (not shown), and then may be implemented to operate upward while the compressed spring is strongly restored by the driving signal of the posture sensor (unit).

Figure 5:
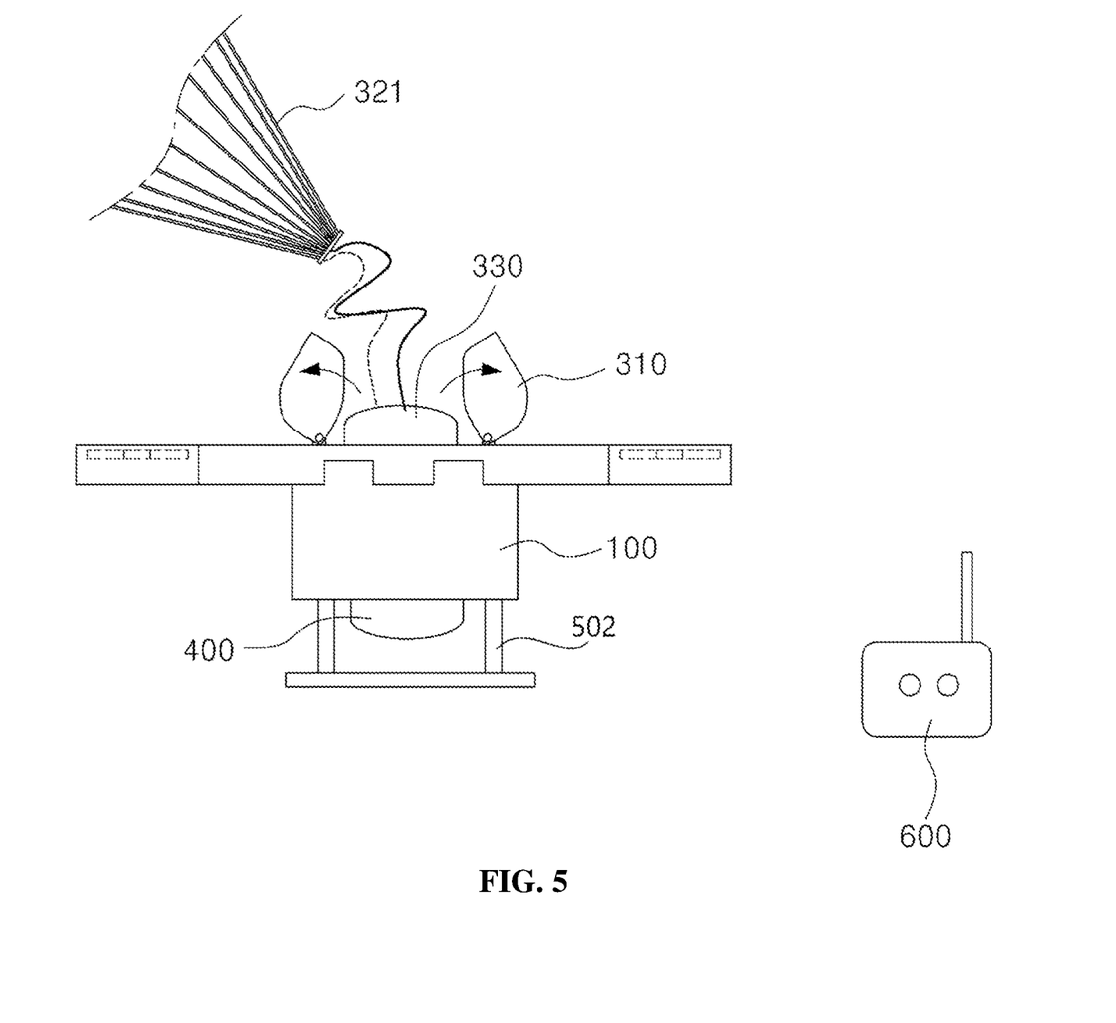
FIG. 5 is drawing showing a state in which the parachute canopy has not been unfolded even though the parachute canopy is ejected to the outside in the drone of this invention.
Figure 8:
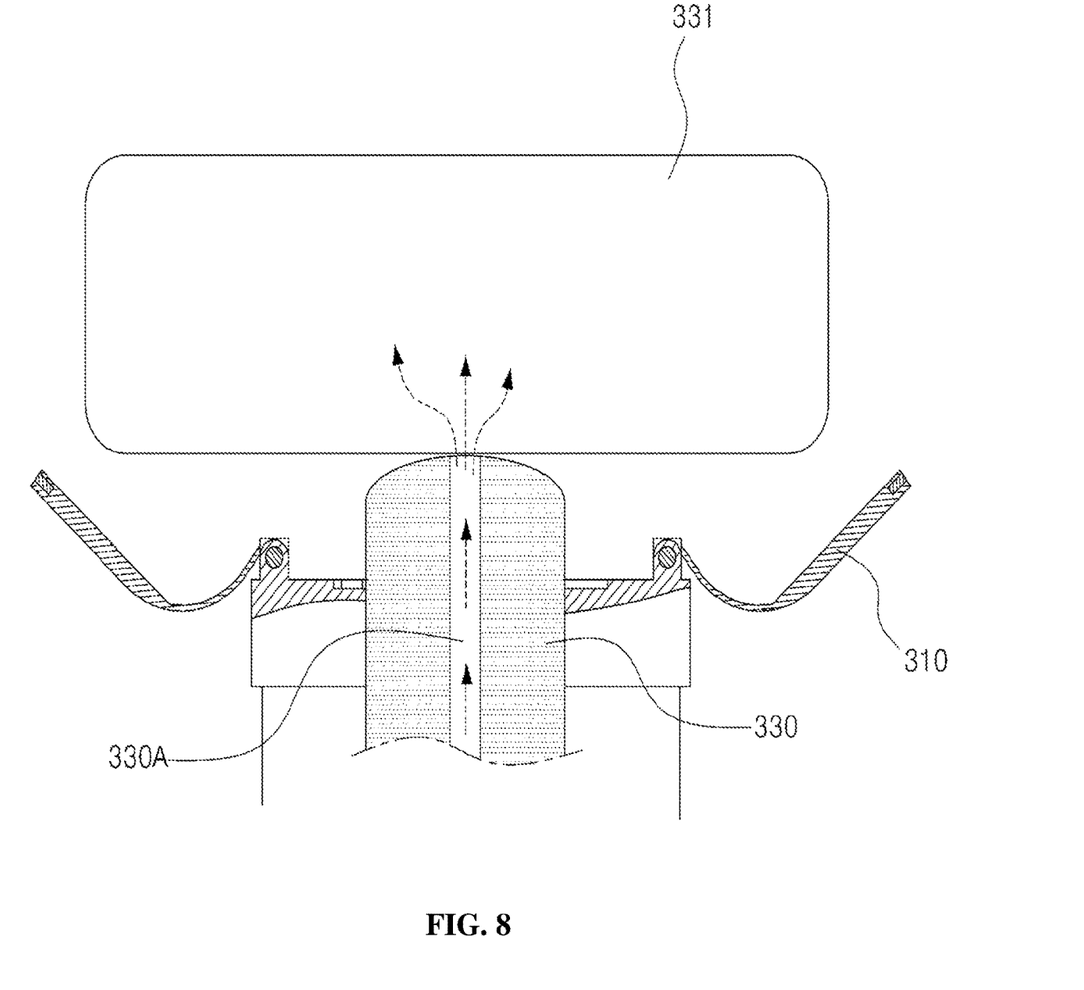
FIG. 8 shows a state in which the upper airbag is inflated in the ejection member according to an embodiment of the present invention.

However, there may be a case in which the parachute canopy 320 ejected to the outside of the drone does not unfold or does not deploy as shown in FIG. 5. In the present invention, in preparation for such a case, the ejection member 330 serves as an upper airbag ejection part for inflating (or expanding) the upper airbag 331 upward as shown in FIG. 8. This will be described in detail below.

Figure 6:
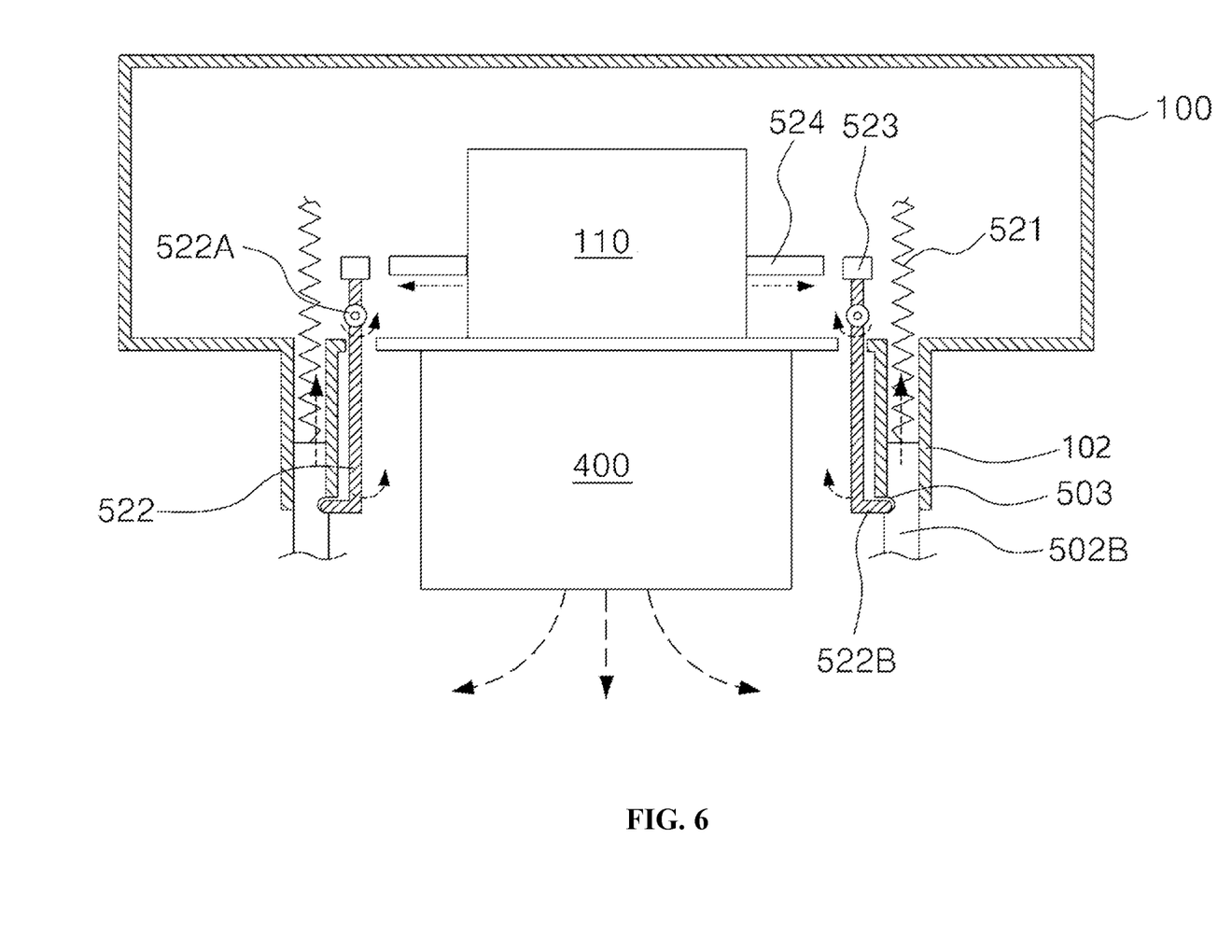
FIG. 6 is a cross-sectional view of the internal configuration of the main body according to one embodiment of the present invention to explain the operation relationship between the vertical landing gear and the actuator in an emergency situation.
Figure 7:
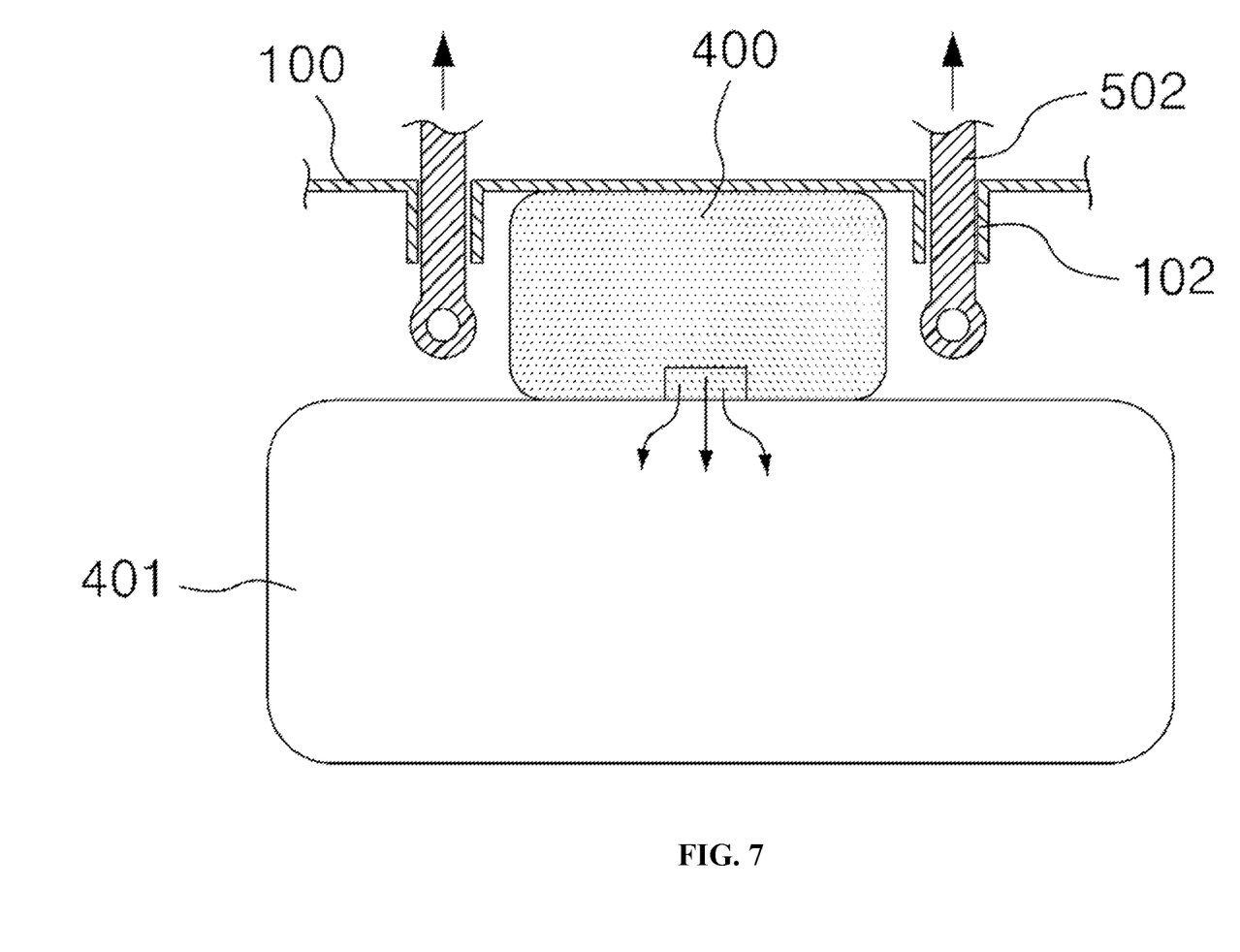
FIG. 7 represents a state in which the lower airbag is inflated according to an embodiment of the present invention.

On the other hand, the lower airbag ejection unit 400 of the present invention is installed under the main body part 100 as shown in FIG. 6 and FIG. 7, and serves to inflate the lower airbag 401 downward in an emergency situation.

The lower airbag ejection unit 400 of the present invention inflates the lower airbag 401 downward without being disturbed by the structure of the landing gear unit 500, which will be described in detail after describing the landing gear unit 500.

Figure 9:
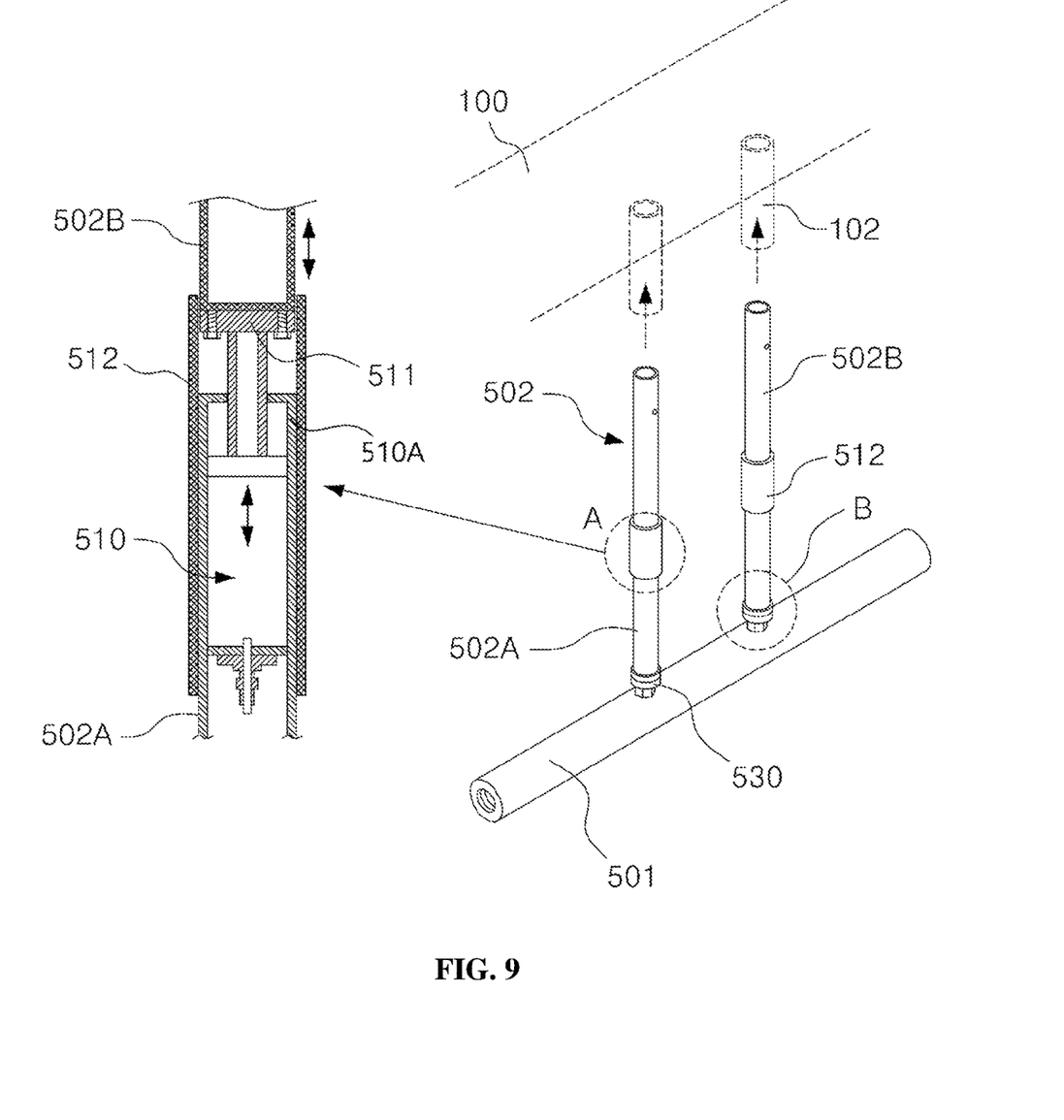
FIG. 9 is a drawing showing the configuration of the landing gear unit according to one embodiment of the present invention and separately showing an example of the coupling structure of the first vertical landing gear and the second vertical landing gear through a buffer damper.

The landing gear unit 500 of the present invention is installed on the lower side of the main body unit 100, as shown in FIGS. 1 and 9, to alleviate shock when the drone lands and to ensure that the drone is stably seated on the landing surface.

Figure 10:
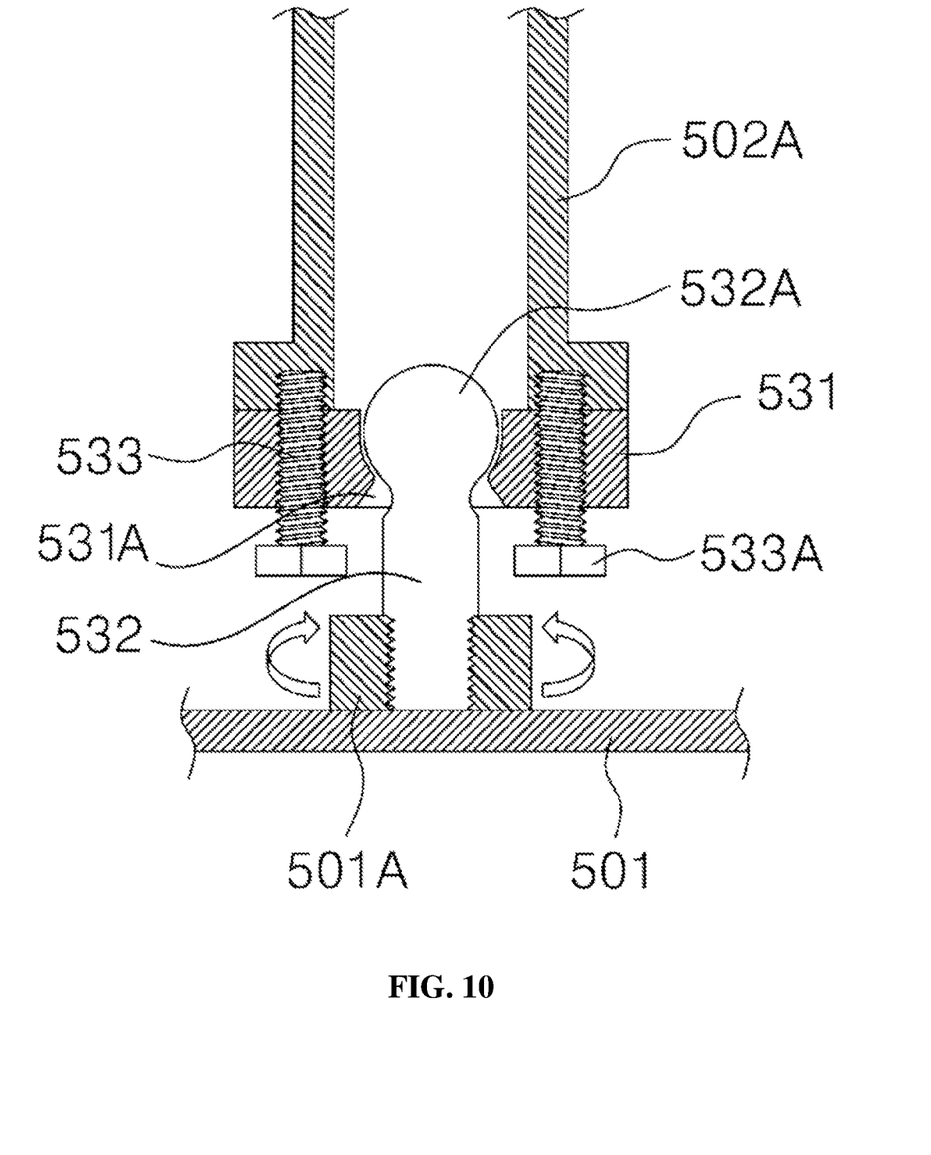
FIG. 10 is a cross-sectional view illustrating a configuration of a landing adjuster according to an embodiment of the present invention.

As shown in FIG. 9 and FIG. 10, the landing gear unit 500 may consist of a pair of horizontal landing gears 501 that are arranged in a horizontal direction based on the main body part 100, have a coupler 501A at the top, and come into contact with the landing surface when the drone lands, and a plurality of vertical landing gears 502 that are arranged in a vertical direction relative to the main body part 100, are coupled to the horizontal landing gear 501, and are respectively inserted into the landing gear insertion tube 102 formed on the lower side of the main body part 100.

In addition, the vertical landing gear 502 includes the first vertical landing gear 502A and the second vertical landing gear 502B, but its height based on the main body part 100 is formed higher than the formation height of the lower airbag ejection unit 400 in normal times, not in emergency situations, so only the horizontal landing gear 501 contacts the landing surface when the drone lands.

As a preferred embodiment of the present invention, as shown in FIG. 9, the first vertical landing gear 502A is provided with a landing adjuster 530 at the bottom that is coupled to the coupler 501A of the horizontal landing gear 501, it is installed on the horizontal landing gear 501 through the landing adjuster 530, and it is provided with a buffer damper 510 at the top.

The buffer damper 510 of the present invention connects the two members between the first vertical landing gear 502A and the second vertical landing gear 502B and relieves or absorbs the shock when the drone lands, and it is a known air damper structure, for example, a known gas spring (or gas shock bar) structure with a cylinder 510A and a cylinder rod 511, as shown in FIG. 9, to buffer or mitigate impact (shock) or vibration acting in a vertical direction to the first vertical landing gear 502A and the second vertical landing gear 502B.

As an embodiment, a covering 512 may be additionally installed on the outside of the first vertical landing gear 502A provided with the buffer damper 510 or on the outer circumferential surface thereof to prevent the rod 511 of the buffer damper 510 from being exposed to the outside.

As shown in FIG. 6 and FIG. 9, the second vertical landing gear 502B is a pipe type member which has its upper end connected to the spring 521 installed inside the main body part 100, and the lower end of which is connected to the rod 511 of the buffer damper 510 to be installed above the first vertical landing gear 502A.

One end of the spring 521 is fixed to one side inside the main body part 100, and the other end of which is connected to the upper end of the second vertical landing gear 502B, and the spring 521 maintains the extended state in normal times when the hook 522B of the activating member 522 is hung on the locking groove 503.

As a result, the second vertical landing gear 502B connected to the spring 521 moves upward when the spring 521 is compressed as it is restored.

As an embodiment of the present invention, the second vertical landing gear 502B is installed in a state connected to the spring 521 that is being extended while a part of the upper side is inserted into the landing gear insertion tube 102 formed under the main body part 100 as shown in FIG. 6 during ordinary time or normal flight.

To describe the operational relationship of the second vertical landing gear 502B in more detail, first of all, the locking groove 503 is formed on one side of the second vertical landing gear 502B, and the hook 522B of the activating member 522 is caught in the locking groove 503 to serve as a stopper, so that the second vertical landing gear 502B connected to the spring 521 is no longer introduced into the landing gear insertion tube 102 and remains fixed.

In the present invention, the activating member 522 is installed on one side of the landing gear insertion tube 102 respectively as shown in FIG. 6 to serve as a stopper for the second vertical landing gear 502B, which is pinned in the main body part 100 to be installed rotatably (or pivotably), and one end of which is formed with a ring-shaped hook 522B that can be caught by the locking groove 503, and the other end of which is provided with a pivoting magnet piece 523 that is a magnet.

Therefore, when the activating member 522 rotates (pivots) and the hook 522B deviates from the locking groove 503 of the second vertical landing gear 502B, the second vertical landing gear 502B is introduced into the landing gear insertion tube 102 by the spring 521, and this rotation (or pivoting movement) of the activating member 522 is realized by the operating magnet piece 524 whose operation is controlled by the control unit 110.

The operating magnet piece 524 is installed inside the main body part 100, and one end of which is made of a magnet with the same magnetism as the pivoting magnet piece 523, and is operated to move toward the pivoting magnet piece 523 under the control of the control unit 110 in an emergency situation.

In more detail, if an emergency situation occurs in which the parachute canopy 320 fails to unfold even though it is ejected to the outside and the drone continues to be in an abnormal flight state for a predetermined period of time (or a preset period of time), the control unit 110 controls the operating magnet piece 524 to move toward the pivoting magnet piece 523 as shown in FIG. 6.

At this time, since the operating magnet piece 524 has the same magnetism as the pivoting magnet piece 523, when the operating magnet piece 524 approaches the pivoting magnet piece 523, the pivoting magnet piece 523 is moved away by the repulsive force, and the pin-coupled activating member 522 rotates (pivots), and as a result, the hook 522B is deviated from the locking groove 503 and the second vertical landing gear 502B connected to the extended spring is introduced into the landing gear insertion tube 102 by the restoring force of the spring 521.

In this way, the reason for pulling the second vertical landing gear 502B or the landing gear unit 500 into the landing gear insertion tube 102 in an emergency in which the parachute is not deployed is to ensure that the landing gear unit 500 does not get in the way when the lower airbag 401 is inflated downward, as shown in FIG. 7.

Therefore, the control unit 110 of this invention determines whether the drone's flight posture is normal through the posture sensor unit, primarily operates the ejection member 330 upward in an emergency situation where the flight posture is abnormal and ejects the parachute canopy 320, afterwards, if the ejected parachute canopy 320 is not deployed and the abnormal state continues for a certain period of time, secondarily, controls the ejection member 330 to inflate the upper airbag 331 upward as shown in FIG. 8 and move the operating magnet piece 524 toward the pivoting magnet piece 523 to bring the second vertical landing gear 502B into the landing gear ejection tube 102 as shown in FIG. 7, and at the same time to inflate the lower airbag 401 downward in the lower airbag ejection unit 400.

As a result, even if the parachute does not unfold, it is possible to prevent damage to the drone and damage to the collision object through the upper airbag 331 and the lower airbag 401.

In addition, the drone of the present invention has a structure that allows the drone to land stably while mitigating the impact without tilting even if the landing surface is not flat.

As a preferred embodiment, the landing adjuster 530 of the present invention includes a coupling piece 531, a rocking member 532, and a number of adjusting bolts 533, as shown in FIG. 10.

The coupling piece 531 is a member coupled to the lower end of the first vertical landing gear 502A, and is formed with a ball receiving groove 531A for accommodating the rocking ball 532A of the rocking member 532.

The ball receiving groove 531A provides a space in which the spherical rocking ball 532A can be seated and freely rocked, and a locking protrusion is formed on the inside to prevent the rocking ball 532A from falling down.

In addition, as a preferred embodiment, the coupling piece 531 may be coupled to the lower end of the first vertical landing gear 502A through an adjusting bolt 533, as shown in FIG. 10.

The rocking member 532 has a rocking ball 532A formed in a spherical shape at the top, wherein the rocking ball 532A is placed in the ball receiving groove 531A to be able to swing, and the lower part of which is screwed to the coupler 501A of the horizontal landing gear 501, and so the horizontal landing gear 501 can freely rock (or swing) up, down, left and right by the rocking ball 532A or the rocking member 532.

The adjusting bolt 533 is provided on the lower part of the coupling piece 531 and in a plurality in all directions or radially around the rocking member 532, and is screwed to the coupling piece 531 with its bolt head 533A facing downward as shown in FIG. 10.

In the landing adjuster 530 of the present invention, the head 533A of the adjusting bolt 533 protrudes slightly downward from the lower surface of the coupling piece 531 in order to adjust or limit the degree to which the horizontal landing gear 501 swings up, down, left, and right, and the degree of protrusion of the head 533A facing downward can be adjusted by loosening or tightening the adjustment bolt 533 screwed to the coupling piece 531. This is because when the horizontal landing gear 501 swings up, down, left, and right and so the rocking member 532 touches the head 533A of the adjusting bolt 533, the swing is limited.

Therefore, even if the drone's landing surface is sloped or not flat, the horizontal landing gear 501 freely swings (or moves) up, down, left and right depending on the terrain, so that the lower surface of the horizontal landing gear 501 is certainly in contact with the landing surface, thereby mitigating the impact of landing and allowing the drone to land or be supported stably.

Although the preferred embodiments of the present invention have been described above, it is obvious to those of ordinary skill in the art that the present invention may be modified in various ways without departing from the scope of the technical idea. Therefore, the above description does not limit the scope of the present invention determined by the following claims.

The invention claimed is:

1. A drone with stable landing and shock absorbing functions, comprising:
   a main body part, in which a control unit is provided inside and a plurality of rotors controlled by the control unit are installed outside;
   a plurality of wing body including a ring-shaped guide disposed on an outer portion of the rotors to surround the rotors and an elastic member one end of which is bisected from the main body part extending to the outside of the main body part and another end of which is connected to the guide, and allowing the elastic member to be split on both sides to absorb shock when a collision occurs against the guide;
   a parachute deployment unit that is installed on an upper side of the main body part and ejects a parachute canopy upward in an emergency situation;
   a lower airbag ejection unit that is installed under the main body part and inflates a lower airbag downward in the emergency situation; and
   a landing gear unit installed on a lower side of the main body part,
   wherein the parachute deployment unit includes:
   a pair of opening-closing covers facing each other correspondingly on the upper side of the main body part, one end of which is hinged respectively, and another end of which is in contact with each other is respectively provided with a magnet having different magnetism;
   the parachute canopy that is stored in a space formed on the upper side of the main body part by the pair of opening-closing covers when the pair of opening-closing covers is covered while being connected to a number of canopy lines, wherein one end of the canopy lines is fixed on the upper side of the main body part; and
   an ejection member which is placed under the parachute canopy, is provided with an upper airbag inside, and operates upward under the control of the control unit in the emergency situation to open the pair of opening-closing covers and eject the parachute canopy to the outside or inflate the upper airbag upward, wherein the landing gear unit comprises:
a pair of horizontal landing gears that comes into contact with a landing surface when the drone lands provided with a coupler formed at a top thereof; and
a plurality of vertical landing gears which are coupled to the pair of horizontal landing gears and are respectively installed into a landing gear insertion tube formed on the lower side of the main body part,
wherein each of the vertical landing gears includes:
a first vertical landing gear which is provided with a landing adjuster coupled to the coupler at the bottom, installed on the pair of horizontal landing gears through the landing adjuster, and provided with a buffer damper at a top thereof; and
a second vertical landing gear which is installed above the first vertical landing gear with a part of an upper side inserted into the landing gear insertion tube formed under the main body part, an upper end of which is connected to a spring installed inside the main body part, the lower end of which is coupled to a rod of the buffer damper, and has a locking groove formed on one side,
wherein an activating member is installed at one side of the landing gear insertion tube respectively, the activating member is pinned rotatably by a pin in the main body part, one end of which is provided with a hook that is configured to be caught by the locking groove, and another end of which is provided with a pivoting magnet piece,
wherein when an operating magnet piece having the same magnetism as the pivoting magnet piece moves toward the pivoting magnet piece under the control of the control unit in the emergency situation and pivots the pivoting magnet piece, then the hook is separated from the locking groove of the second vertical landing gear and the second vertical landing gear connected to the spring in an extended state is drawn into the landing gear insertion tube by a restoring force of the spring, wherein the landing adjuster includes:
a coupling piece which is coupled to a lower end of the first vertical landing gear and has a ball receiving groove for accommodating a rocking ball;
a rocking member in which the rocking ball formed in a spherical shape on an upper part thereof is placed to be rocked in the ball receiving groove, and a lower part thereof is screwed to the coupler;
a plurality of adjusting bolts which are provided at a bottom of the coupling piece in all directions or radially around the rocking member and are screwed to the coupling piece so as to adjust a degree of protrusion of a head facing downward,
wherein the control unit includes a posture sensor that detects the drone's flight posture and a wireless communication unit that is configured to communicate wirelessly with a remote controller,
wherein the control unit determines whether the drone's flight posture is normal through the posture sensor, in case of the emergency situation where the flight posture is abnormal, primarily operates the ejection member upward to ejects the parachute canopy, afterwards, if the ejected parachute canopy is not deployed and the abnormal posture continues for a certain period of time, under the control of the control unit, the upper airbag is inflated upward by the ejection member and the operating magnet piece is directed toward the pivoting magnet piece so that the second vertical landing gear is drawn into the landing gear insertion tube, and at the same time the lower airbag is inflated downward by the lower airbag ejection unit.

2. The drone of claim 1, wherein the guide of the wing body is provided with a cushioning material made of a memory foam material on an outer circumferential surface thereof; and
the elastic member of the wing body comprises ethylene vinyl acetate (EVA), Linear Low Density Poly Ethylene (LLDPE), and natural rubber.

\* \* \* \* \*